March 4, 1969 E. D. RICHARD 3,431,528
ALL-METAL SEAL AND THERMAL SWITCH
Filed June 4, 1954

INVENTOR
Eugene D. Richard

BY W. E. Thibodeau + A. W. Dew
ATTORNEYS

United States Patent Office 3,431,528
Patented Mar. 4, 1969

3,431,528
ALL-METAL SEAL AND THERMAL SWITCH
Eugene D. Richard, Hyattsville, Md., assignor to the United States of America as represented by the Secretary of the Army
Filed June 4, 1954, Ser. No. 434,686
U.S. Cl. 337—414                        5 Claims
Int. Cl. H01h 37/76

The invention described herein may be manufactured and used by or for the Government for governmental purposes without the payment to me of any royalties thereon.

This invention relates to thermal batteries and more particularly to a combination seal and thermal switch for thermal batteries.

One object of the invention is a new and novel hermetic seal for thermal batteries.

Another object of the invention is to utilize the hermetic seal to maintain a short circuit on the battery until the battery is activated.

A further object of the invention is a means for breaking the hermetic seal to remove the short circuit from the battery after the battery is fully activated.

A still further object of the invention is a heat activated hermetic seal-switch for thermal batteries.

An additional object of the invention is to utilize a hermetic sealing device as a thermal switch to maintain the battery in short circuit condition until the battery is activated.

The specific nature of the invention as well as other objects and advantages thereof will clearly appear from the following description and drawings in which.

Figure 1:
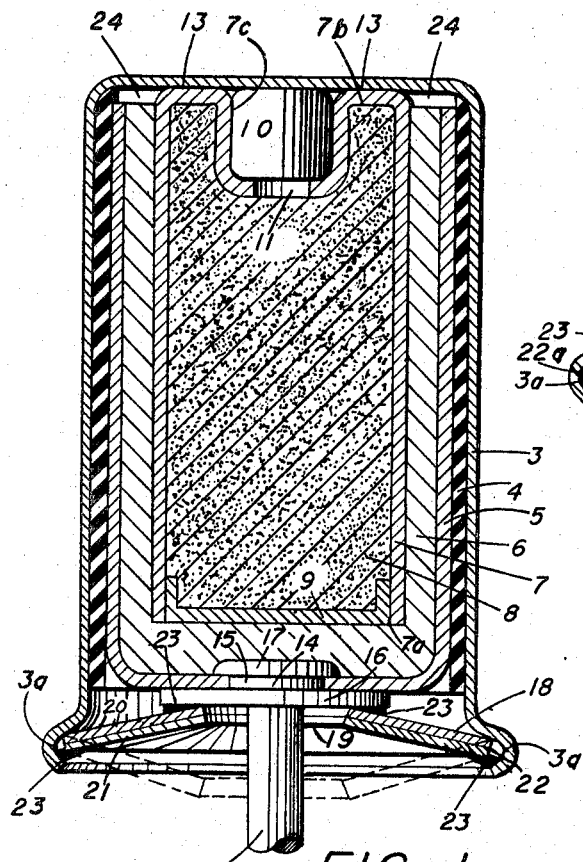
FIGURE 1 is a longitudinal axial sectional view of a single cell thermal battery embodying the invention.

A preferred embodiment of the invention is shown in FIG. 1 wherein 3 indicates the outer case of a thermal cell and 4 an insulating material spacing the outer case 3 and negative electrode 5. A solid electrolyte 6, which becomes liquid when activated is positioned between the negative electrode 5 and the positive electrode 7. Heat powder 8 is positioned centrally of the battery. Heat powder 8 is separated from the electrolyte 6 at the open end 7a of positive electrode 7 by closure member 9. The opposite end 7b of positive electrode 7 is formed with a recess 7c having positioned therein primer 10. An aperture 11 in the base of recess 7c provides means of communication between primer 10 and heat powder 8. In axial alignment with primer 10 and opposite thereto is the negative terminal 12 affixed to negative electrode 5. Outer case 3 constitutes the positive terminal of the battery and is in conductive relationship with positive electrode 7 as indicated by 13. Negative terminal 12 is provided with collar 14 which is pressed within opening 15 of negative electrode 5. Collar 16 is positioned about terminal 12 and is affixed to the lower end of negative electrode 5. The portion of negative terminal 12 which extends above collar 14 is peened over the inner surface of negative terminal 5, as indicated by numeral 17, to seal negative terminal 12 to negative electrode 5.

A dish-shaped sealing member 18 is provided with perforation 19 through which terminal 12 passes. Member 18 is positioned in the cannelure 3a of the outer case 3, and is preferably of bimetallic construction, the coefficient of expansion of the upper plate 20 of the said member being greater than the coefficient of expansion of the lower plate 21. Upper plate 20 is bonded to collar 16 adjacent perforation 19 and lower plate 21 is bonded along its outer edge 22 in the cannelure 3a of outer case 3. The bonding agent is preferably a eutectic solder 23. Numeral 24 indicates an annular air gap.

In its normal position the bimetallic dish-shaped member provides hermetic sealing for the battery. Hermetic sealing is necessary to prevent decomposition of the battery in storage. In its normal position the bimetallic member also maintains the battery in short circuit condition inasmuch as negative terminal 12, collar 16, and dish-shaped member 18 are all in current conducting relationship. A shorted battery is necessary to prevent the utilizing means, not shown, from becoming energized should the battery become prematurely activated.

When primer 10 is initiated it, in turn, ignites heat powder 8, aperture 11 providing the ignition path. The heat released by the burning of the heat powder causes electrolyte 6 and solder 23 to melt, and the battery to activate, whereupon dish-shaped member 18 "snaps" out of contact with collar 16 to remove the short circuit from the battery. The greater expansion of upper plate 20 over lower plate 21 under high temperature condition causes dish-shaped member 18 to flare outward to remove it from contact with collar 16. The aforementioned functioning of the plates 20 and 21 occurs in a predetermined time sequence, the purpose being to maintain the battery in short circuit condition for a predetermined interval of time following the firing of battery primer 10.

Figure 3:
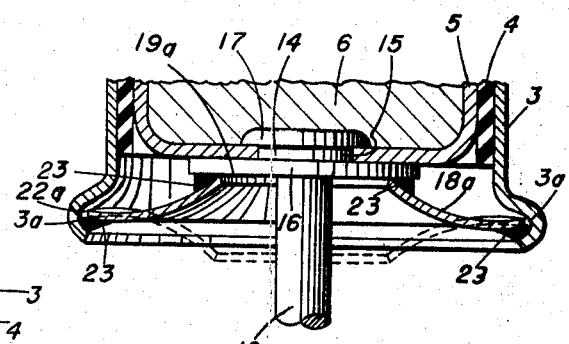
FIGURE 3 is a fragmentary sectional view of the invention showing a modification of the hermetic seal-switch.
Figure 2:
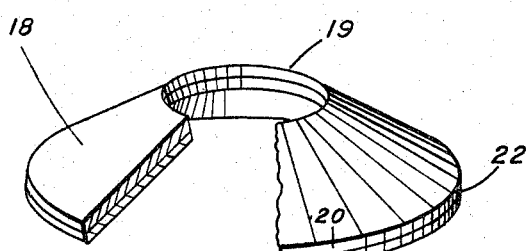
FIGURE 2 is a perspective view of the bimetallic hermetic seal-switch means.

FIG. 3 shows a modification of the invention which comprises a single plate sealing member 18a which is substituted for bimetallic member 18. Member 18a is provided with perforation 19a. The said member is stressed inwardly and, while stressed, is bonded along its outer edge 22a to the cannelure 3a formed in outer case 3, and to collar 16 adjacent perforation 19a. The bonding agent is preferably a eutectic solder 23. When the battery is activated it becomes hot. The heat produced by that activation causes the solder to melt. Dish-shaped member 18a "snaps" outwardly and out of contact with collar 16 to remove the short circuit from the battery.

It will be apparent that the embodiment shown is only exemplary and that various modifications can be made in construction and arrangement within the scope of the invention as defined in the appended claims.

I claim:

1. In a thermal battery, a hermetic seal-switch having contact means, an actuating member for engaging said contact means to maintain the battery hermetically sealed and in short circuit condition, said actuating member comprising a dished flexible snap disc provided with a perforation centrally thereof, said disc being initially flexed inwardly but adapted to flex outwardly to remove said short circuit from the battery, and supporting means for said dish-shaped member.

2. In a thermal battery, a hermetic seal-switch affixed in one end thereof, the said battery being provided with an outer case comprising the first switch terminal, a second switch terminal extending from said battery centrally thereof, an actuating member for bridging said terminals to maintain the battery hermetically sealed and in short circuit condition, said actuating member comprising a dished flexible snap disc provided with a preforation centrally thereof, said disc being initially flexed inwardly and adapted to flex outwardly to break contact with at least one battery terminal to remove said short circuit, and support means for said dish-shaped member comprising a cannelure formed in said one end, the said hermetic seal being releasably fixed in said cannelure by bonding said disc along the periphery thereof to said cannelure and along the edge of said perforation to said central terminal.

3. The invention in accordance with claim 2, wherein the said dish-shaped member bonding agent is a eutectic solder adapted to melt at a predetermined temperature to release said dish-shaped member from said terminals.

4. The invention in accordance with claim 3, wherein said flexible snap member comprises a bimetallic temperature responsive element constructed and arranged to flex into switch opening position upon the attainment of a predetermined temperature.

5. The invention in accordance with claim 3, wherein said flexible snap member is normally stressed inwardly, but adapted to snap outwardly and out of contact with at least one of said terminals when freed by the said bonding agent upon the melting thereof.

No references cited.

RODNEY D. BENNETT, *Primary Examiner.*

U.S. Cl. X.R.

377—401